United States Patent [19]

Dzjuban et al.

[11] Patent Number: 4,875,040

[45] Date of Patent: Oct. 17, 1989

[54] DEVICE FOR REMOTE CONTROL OF ELECTRICAL APPARATUS

[76] Inventors: Vitaly S. Dzjuban, ulitsa 50-letia SSSR, 37, kv. 41; Alexandr D. Sazhin, ulitsa Gertsena, 38, kv. 44; Valery K. Zhitnikov, ulitsa 50-letia SSSR, 143A, kv. 28; Anatoly I. Konoplyanko, ulitsa Schetinina, 17, kv. 179, all of Donetsk, U.S.S.R.

[21] Appl. No.: 190,771

[22] Filed: May 6, 1988

[51] Int. Cl.[4] .................... H04Q 9/00

[52] U.S. Cl. .................... 340/825.060; 340/825.710; 340/825.160; 340/825.770; 361/139

[58] Field of Search .................... 340/825.06, 825.17, 340/825.18, 825.57, 825.62, 825.71, 825.77, 500; 361/139, 160

[56] References Cited

U.S. PATENT DOCUMENTS

| | | | |
|---|---|---|---|
| 3,473,152 | 10/1969 | Lunquist et al. | 340/825.57 |
| 3,588,828 | 6/1971 | Schulein | 340/825.77 |
| 4,109,186 | 8/1978 | Fraque | 340/825.77 |
| 4,556,882 | 12/1985 | Brifman et al. | 340/825.06 |

FOREIGN PATENT DOCUMENTS

| | | |
|---|---|---|
| 150933 | 3/1961 | U.S.S.R. . |
| 928529 | 8/1980 | U.S.S.R. . |

*Primary Examiner*—Donald J. Yusko
*Assistant Examiner*—E. O. Pudpud
*Attorney, Agent, or Firm*—Ladas & Parry

[57] ABSTRACT

A device has a communication line leading to a control desk and a power supply connected to the communication line. Connected to the power supply are two circuits each comprising a unit for testing the communication line for condition and a current amplifier which are connected in series with each other. Connected to the inputs of each current amplifier is an interference suppression unit having its input connected to a current comparison unit. Two current comparison units are connected to the power supply and an electrical apparatus being controlled. The device also has a logical circuit connected to the power supply and the test units and an actuating unit connected to the logical circuit and one of the test units and coupled to the electrical apparatus.

4 Claims, 4 Drawing Sheets

DEVICE FOR REMOTE CONTROL OF ELECTRICAL APPARATUS

The present invention relates to devices for remote indication of network modes of operation and, more particularly, to devices for remote control of an electrical apparatus.

INDUSTRIAL FIELD TO BE APPLIED

The invention may be used for controlling switching apparatuses used in dangerously explosive environment at the plants of coal, oil, natural gas, chemical and other industries with a dangerously explosive atmosphere.

BACKGROUND OF THE INVENTION

Known in the art is a device for the remote control of current collectors (SU, A, 150933), comprising a two-wire communication line leading to a control desk, a bridge circuit for measuring impedance in the communication line which circuit has a current amplifier in the diagonal thereof which is connected to a first winding of a magnetic member having its second winding connected to a power supply circuit of the bridge measuring circuit and to one wire of the communication line being tested.

However this device has not come into use because the magnetic member is difficult to manufacture under batch production conditions, the accuracy in measuring impedance in the communication line is influenced by the ambient temperature, and operation is unstable when pulse noise caused by transient conditions when starting electrical motors appears in the communication line.

Known in the art is a device for remote control of an electrical apparatus (SU, A, 928529), comprising a control desk, a communication line, a power supply connected to the control desk and communication line, two current amplifiers connected to the power supply and built around two transformers. The device also comprises two units for testing the communication line for condition, each unit being in the form of an electromagnetic relay having its inputs connected to the power supply and its outputs connected to the current amplifiers. Connected to the power supply is a current comparison unit in the form of an electromagnetic relay having two windings having a normally closed output contact, two coupling diodes, three resistors and two capacitors which are connected to the power supply via the coupling diodes. Starts leads of the two winding relay coils are connected to one wire of the communication line via oppositely connected diodes and to the other wire of the communication line via the capacitors.

A logical circuit of the device is built around an electromagnetic relay and connected to the power supply, an actuating unit being connected to an electrical apparatus being controlled.

Upon a fault of the actuating unit elements resulting, e.g., from the relay failure, adhesion of contacts or failure of return springs, there is a danger of inadvertent switching on of the electrical apparatus being controlled, or it may become impossible to switch it off. Furthermore, an inadvertent actuation of the current comparison unit and actuating unit may occur when voltage is supplied to the circuit or after opening of the contacts which shunt the communication line and which are practically used as control contacts. This can be explained by the fact that in the case when voltage is supplied to the communication line during a half-cycle when a terminal diode is blocked, one capacitor of the current comparison unit is substantially instanteneously charged to the voltage of the communication line while voltage across the other capacitor of the unit is equal to zero.

The two winding relay which tests the capacitors of the current comparison unit for serviceability also makes the circuit more complicated and impairs reliability of its operation. A change in the capacity of these capacitors during operation may cause false operation of this relay under transient conditions because of the different rate of change in current in the circuits of the relay windings. Furthermore, there are considerable variations in current for switching on/off the electromagnetic relay which substantially complicates adjustment of the current comparison unit.

SUMMARY OF THE INVENTION

It is an object of the invention to provide blocking of an electrical apparatus being controlled in case any unit of the device fails.

It is another object of the invention to improve the reliability of the device.

The invention resides in that a device for remote control of an electrical apparatus, comprising a communication line to a control desk and a power supply connected to this communication line, first and second units for testing the communication line for condition, having their inputs connected to the power supply, first and second current amplifiers having their inputs connected to the inputs of the first and second units for testing the communication line for condition, respectively, the outputs of both current amplifiers being connected to the power supply, a main current comparison unit having its first and second inputs connected to the power supply and its third input connected to an electrical apparatus, a logical circuit having its inputs connected to the power supply and units for testing the communication line for condition, respectively, and an actuating unit connected to the logical circuit and coupled to the electrical apparatus, according to the invention, is provided with an additional current comparison unit having its first and second inputs connected to the power supply and its third input connected to the electrical apparatus and with two interference suppression units, the input of one of their units being connected to the output of the main current comparison unit and its output being connected to the input of the first current amplifier, the input of the other interference suppression unit being connected to the output of the additional current comparison unit and its output being connected to the input of the second current amplifier; a respective output of the first unit for testing the communication line for condition is connected to an input of the actuating unit.

In order to eliminate influence of pulse interferences which occur in the communication line on the device operation by introducing the transmission time delay of the control signal and by providing the initial state of the device during a rest interval (absence of the signal), each interference suppression unit should preferably comprise a limiting resistor having one lead which is the input of the interference suppression unit, a diode having its anode lead connected to the other lead of the limiting resistor, first and second capacitors each having one lead which is the output of the interference suppression unit, the other lead of the first capacitor being connected to the anode lead of the diode, the other lead of the second capacitor being connected to the cathode lead of the diode, a Zener diode having its cathode lead connected to the other lead of the second capacitor and the cathode lead of the diode, the anode lead of the Zener diode being a respective output of the interference suppression unit, first and second resistors each having one lead connected to the cathode lead of the diode, a third resistor having one lead connected to the anode lead of the diode, first and second transistors each having the emitter lead which is a respective output of the interference suppression unit, the collectors of both transistors being connected to the cathode lead of the diode via the first and second resistors, respectively, the base of the first transistor being connected to the anode lead of the diode via the third resistor, the base of the second transistor being connected to the collector of the first transistor.

In order to provide the blocking which ensures disconnection or nonswitching of the electrical apparatus being controlled, in case any unit of the control device fails, the logical circuit should preferably comprise a rectifier connected to the power supply, a filter having its leads connected to respective leads of the rectifier, a limiting resistor having one of its leads connected to a respective lead of the rectifier, a relay having a winding one of whose leads is connected to the other lead of the limiting resistor and whose other lead is a respective output of the logical circuit, and a contact connected to the actuating unit, and also a capacitor connected in parallel with the relay winding and a resistor having its leads connected to respective outputs of the first and second units for testing the communication line for condition.

In order to ensure high accuracy in measuring impedance in the communication line independently of voltage fluctuations in the power supply network and to eliminate false signals during switching on of the device according to the invention, each current comparison unit should preferably comprise a series circuit including a first resistor having one lead connected to the power supply, a first diode, a second resistor, a third resistor having its leads are also connected to the leads of the electrical apparatus, and a second diode whose cathode is connected to the power supply and as a first capacitor having its leads connected to the anode lead of the first diode and the cathode lead of the second diode and a series circuit including a fourth resistor having its lead connected to the power supply, a third diode, a fifth resistor having its lead connected to the anode lead of the second diode and also a second capacitor having its leads connected to the cathode lead of the third diode and the power supply and a transistor having its emitter connected to the power supply, its collector connected to the input of a respective interference suppression unit and its base lead connected to the anode lead of the second diode, the charge time constant of the first capacitor being greater than the charge time constant of the second capacitor and the discharge time constant of the first capacitor being smaller than that of the second capacitor.

This invention makes it possible to improve the reliability and service life of the device for remote control of an electrical apparatus and to use it in dangerously explosive environment.

BRIEF DESCRIPTION OF DRAWINGS

The invention will now be described with reference to a specific embodiment shown in the accompanying drawings, in which.

DETAILED DESCRIPTION OF THE INVENTION

Figure 1:
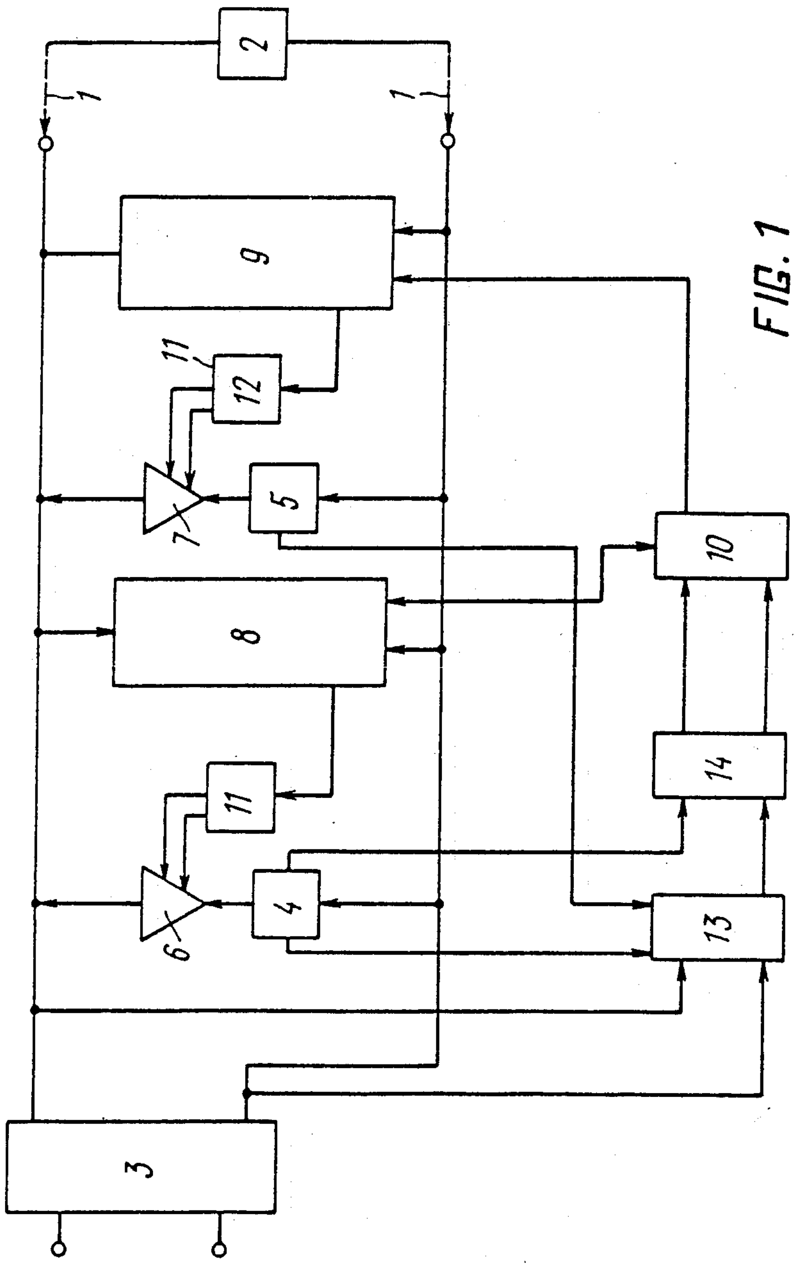
FIG. 1 illustrates a functional diagram of a device for remote control of an electrical apparatus, according to the invention.

A device for remote control of an electrical apparatus according to the invention comprises a communication line 1 (FIG. 1) leading to a control desk 2 and a power supply 3 connected to the communication line 1. Connected to the power supply 3 are inputs of units 4, 5 for testing the communication line for condition. Connected to outputs of the units 4,5 are inputs of current amplifiers 6,7 the outputs of which are connected to the power supply 3. The device also comprises current comparison units 8,9 each having its first and second inputs connected to the power supply 3 and its third input connected to an electrical apparatus 10 being controlled.

Connected to an output of the unit 8 is an input of an interference suppression unit 11 having its outputs connected to the respective inputs of the current amplifier 6. Connected to the unit 9 is an input of an interference suppression unit 12 having its outputs connected to the respective inputs of the current amplifier 7. The device also comprises a logical circuit 13 having its inputs connected to the power supply 3 and testing units 4,5 and an actuating unit 14 connected to the logical circuit 13, testing unit 4 and coupled to the electrical apparatus 10.

The power supply 3 (FIG. 2) is in the form of a voltage transformer. The unit 4 or 5 for testing the communication line for condition comprises a resistor 15 having one lead connected to one lead of a secondary winding of the transformer of the power supply 3, an electromagnetic relay 16 having a coil 17 and a switching contact 18 which are mechanically coupled with each other. One lead of the coil 17 is connected to the other lead of the resistor 15, the other lead of the coil 17 is the output of the unit 4 or 5, the combined leads of the contact 18 being the output of the unit 4 or 5 which is connected to a respective input of the logical circuit 13 (FIG. 1). In addition, the leads of the coil 17 (FIG. 2) are shunted by a capacitor 19.

The amplifier 6 or 7 comprises a transistor 20 having its collector connected to the lead of the coil 17 of the relay 16. The emitter of the transistor 20 is connected to the anode of a diode 21 having its cathode connected to the other lead of the secondary winding of the transformer of the power supply 3.

The interference suppression unit 11 or 12 comprises a limiting resistor 22 one lead of which is the input of the unit 11 or 12 and the other lead of which is connected to the anode of a diode 23. The cathode of the diode 23 is connected to the cathode of a Zener diode 24 having its anode lead which is the output of the unit 11 or 12 and is connected to the base of the transistor 20 of the amplifier 6 or 7. Each unit 11 or 12 also comprises two transistors 25 and 26 having their emitter leads, which are the outputs of the unit 11 or 12, connected to the anode of the diode 21 of the amplifier 6 or 7 and the collectors thereof connected to the cathode of the diode 23 via resistors 27 and 28, respectively. The base of the transistor 25 is connected to the collector of the transistor 26 having its base connected to the anode of the diode 23 via a resistor 29. The unit 11 or 12 also comprises two capacitors 30 and 31 each having one lead connected to the anode of the diode 21 of the amplifier 6 or 7, this lead being one of the outputs of the unit 11 or 12. The other lead of the capacitor 30 is connected to the cathode lead of the diode 23, and the other lead of the capacitor 31 is connected to the anode lead of the diode 23.

Figure 3:
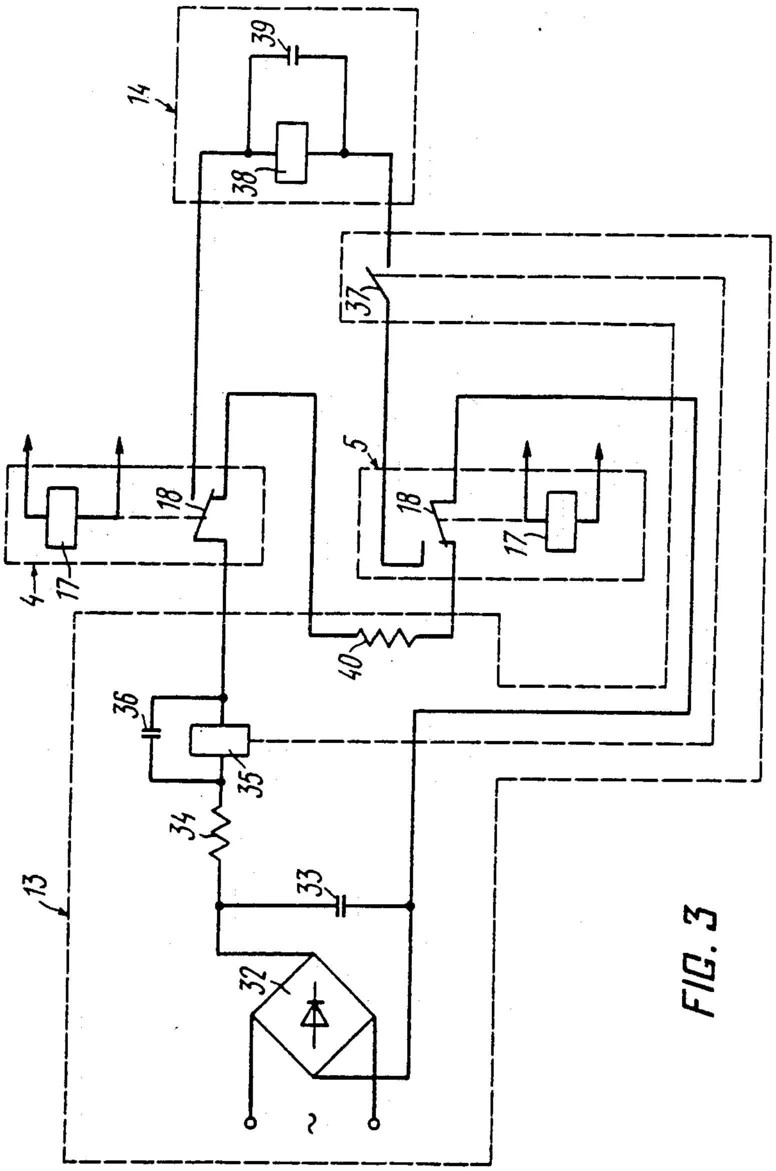
FIG. 3 illustrates a circuit diagram of a logical circuit, according to the invention.

The logical circuit 13 may be as shown in FIG. 3. It comprises a full-wave rectifier 32, a filter 33 connected to respective leads of the rectifier 32, a limiting resistor 34 having one lead thereof connected to the positive lead of the rectifier 32 and the other lead thereof connected to one of the leads of the winding 35 of the electromagnetic relay. The other lead of the winding 35 of the electromagnetic relay is connected to a switching contact 18 of the unit 4 for testing the communication line for condition. Both leads of the winding 35 of the relay are connected to respective leads of a capacitor 36. The electromagnetic relay has a normally opened contact 37 having one lead thereof connected to one of the leads of an electromagnetic relay 38 of the actuating unit 14.

The other lead of the normally opened contact 37 is connected to the switching contact 18 of the unit 5 for testing the communication line for condition. The other lead of the electromagnetic relay 38 of the actuating unit 14 is connected to the switching contact 18 of the unit 4. Both leads of the relay 38 of the unit 14 are connected to the leads of a capacitor 39.

The logical circuit—also comprises a resistor 40 having one lead thereof connected to the switching contact 18 of the unit 4 and the other lead thereof connected to the switching contact 18 of the unit 5, the switching contact 18 having one of the leads thereof connected to the negative lead of the rectifier 32.

Figure 4:
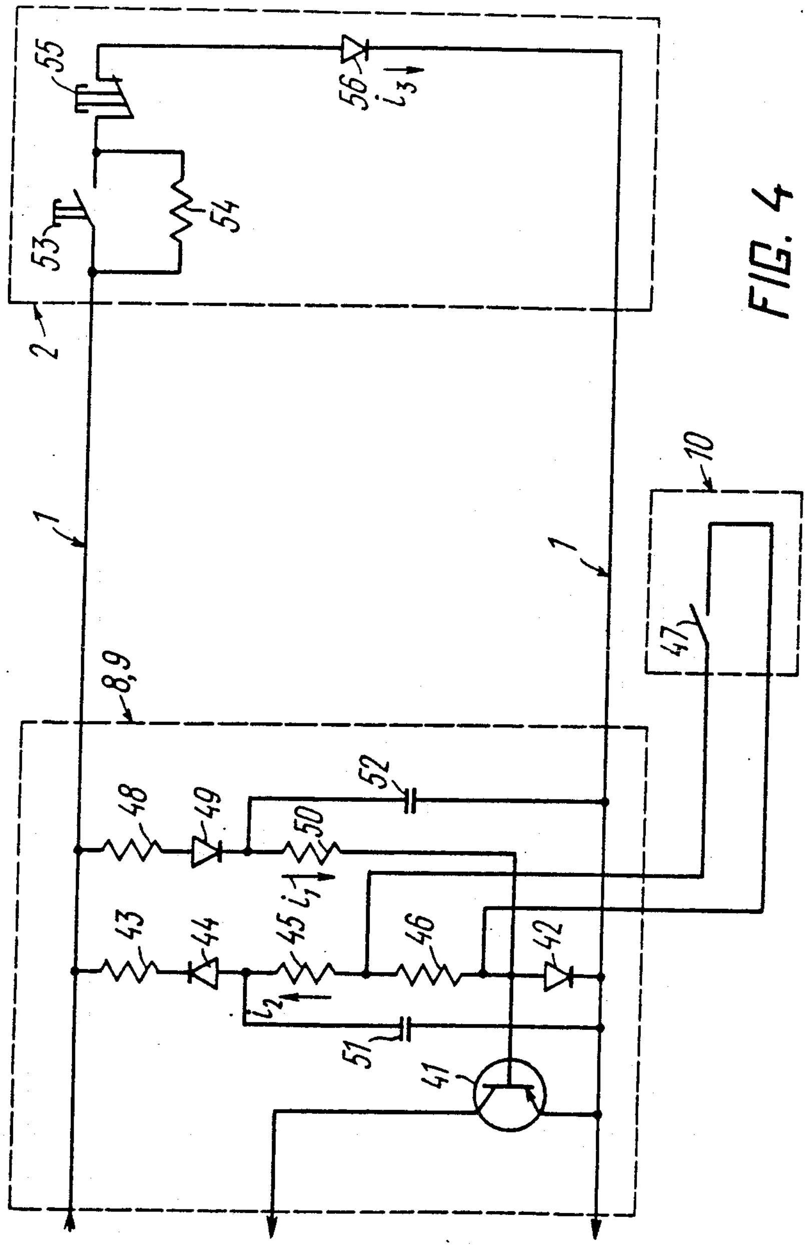
FIG. 4 illustrates a circuit diagram of a current comparison unit, according to the invention.

FIG. 4 shows a circuit diagram of the current comparison units 8,9. It comprises a transistor 41 having its emitter connected to the power supply 3 and communication line 1 and its collector connected to the interference suppression unit 11 or 12. The base of the transistor 41 is connected to the anode of a diode 42 having its cathode connected to the power supply 3 and communication line 1.

The current comparison unit 8 or 9 also comprises two parallel circuits one of which is a series circuit including a resistor 43, a diode 44 having its cathode lead connected to one of the leads of the resistor 43 and its anode lead connected to one of the leads of the resistor 45. The other lead of the resistor 43 is connected to the power supply 3 and communication line 1.

One lead of the resistor 46 in the first parallel circuit is connected to the resistor 45, and the other lead of the resistor 45 is connected to the anode lead of the diode 42. Both leads of the resistor 46 are also connected to the leads of a normally opened contact 47 of the electrical apparatus 10 being controlled.

The other parallel circuit is in the form of a series circuit including a resistor 48, a diode 49 and a resistor 50, one lead of the resistor 48 being connected to the power supply 3 and communication line 1, the other lead of the resistor 48 being connected to the anode lead of the diode 49. One lead of the resistor 50 is connected to the cathode lead of the diode 49, and the other lead of the resistor 50 is connected to the anode lead of the diode 42.

The current comparison unit 8 or 9 also comparises two capacitors 51 and 52 each having one lead connected to the power supply 3 and communication line 1, the other lead of the capacitor 51 being connected to the anode lead of the diode 44, and the other lead of the capacitor 52 being connected to the cathode lead of the diode 49.

To carry out the remote control of the electrical apparatus, the control desk 2 is connected to the communication line 1. The control desk 2 comprises a "Start" button 53 having its normally opened contacts connected to respective outputs of a resistor 54 and a "Stop" button 55 having one of its normally closed contacts connected to a respective contact of the button 53 and the other of its normally closed contacts connected to the anode of a diode 56 having its cathode connected to the communication line 1.

The device for remote control of an electrical apparatus according to the invention function as follows.

When voltage is applied to the power supply 3 (FIG. 1), its is applied from the secondary winding thereof to all assemblies and units of the control device.

When the elements of the current amplifiers 6,7 interference suppression units 11,12 and current comparison units 8,9 as well as the communication line 1 are in good condition, the electromagnetic relays 16 (FIG. 2) provided in the units 4 and 5 for testing the communication line for condition remain de-energized. As a result, the output signals of the units 4 and 5 (FIG. 1) are fed to respective inputs of the logical circuit 13 so as to cause current to flow in the winding 35 (FIG. 3) of the electromagnetic relay. The resistors 34 and 40 are provided to limit the current in the winding 35. When the electromagnetic relay operates, its contact 37 is closed so as to prepare the actuating unit 14 for actuation.

The current supplied from the power supply 3 (FIG. 1) is distributed among parallel paths in the following manner: currents $i_1$ and $i_2$ (FIG. 4) flow in two paths of each other current comparison unit 8 or 9, and current $i_3$ flows in the path of the control desk 2.

These currents are so distributed that the current $i_1$ is considerably greater than the currents $i_2$ and $i_3$. As a result, the transistors 41 of the units 8 and 9 are blocked, and the electromagnetic relays 16 (FIG. 2) of the units 4 and 5 for testing the communication line for condition are de-energized.

On pressing the button 53 (FIG. 4) of the control desk 2 the current $i_3$ flowing through the diode 56 becomes considerably greater than the current $i_1$, and the current $i_2$ increases resulting in that the transistors 41 in the units 8,9 becomes conductive.

Figure 2:
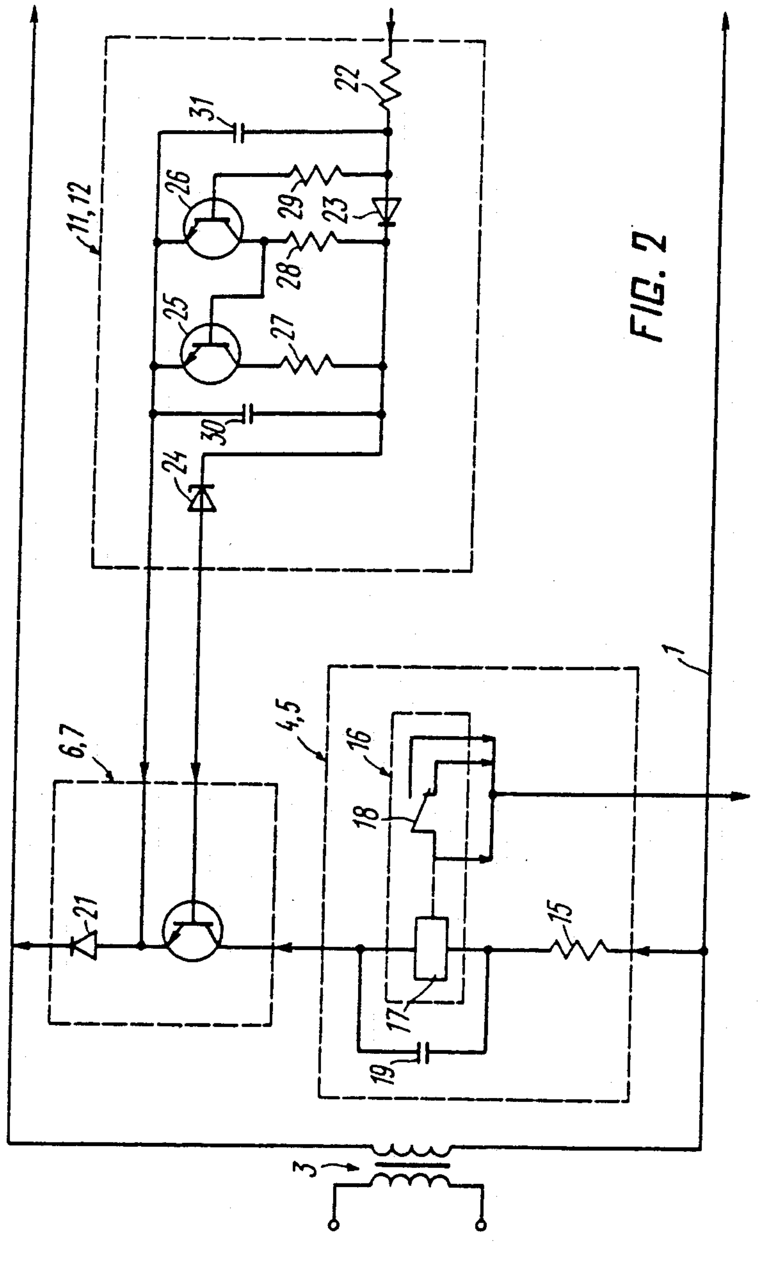
FIG. 2 illustrates a circuit diagram of an interference suppression unit, according to the invention.

Thus the currents $i_1$ and $i_2$ in the circuits of the diodes 44 and 49 are compared. The capacitors 51 and 52 are necessary to maintain current in the paths during the half-cycle when the diodes 44 and 49 are blocked. The generated control signals are supplied from the outputs of the units 8 and 9 to the inputs of the interference suppression units 11 and 12 (FIG. 2). The control signal is distributed in each unit 11 or 12 among two parallel paths. One path consists of the resistor 22, diode 23 and capacitor 30, the other path consists of the resistor 22, resistor 29 and emitter-to-base junction of the transistor 26. As a result the transistor 26 becomes conductive, and the collector current flows through the resistor 28. This results in the appearance of a negative potential at the base of the transistor 25, and the transistor 25 remains blocked. At the same time, the capacitor 30 is charged to the voltage of the power supply 3. When voltage across the capacitor 30 reaches a preset value, the Zener diode 24 becomes conductive resulting in the appearance of currents in the bases of the transistors 20 of each current amplifier 6 and 7. As a result, the electromagnetic relays 16 of the test units 4 and 5 are energized. Actuation of the relay 16 results in the contacts 18 (FIG. 3) being switched over, hence, the electromagnetic relay 38 of the actuating unit 14 being connected to the rectifier 32. During switching of the contacts 18, current continues to flow in the winding 35 by virtue of energy stored in the capacitor 36. The electromagnetic relay 38 of the actuating unit 14 is thus actuated, and signals fed to the inputs of the electrical apparatus being controlled are generated at the outputs of the unit 14 (FIG. 1). When the electrical apparatus 10 being controlled is switched on, its contact 47 (FIG. 4) is closed so as to shunt the resistors 46 of the current comparison units 8,9. This makes it possible to increase the currents $i_2$ in the circuits of the bases of the transistors 41; therefore when the contacts of the button 53 of the control desk 2 are opened, current $i_2$ remains greater than current $i_2$, the transistors 41 of the current comparison units 8, 9 remain conductive, and the electrical apparatus 10 being controlled remains switched on.

It only takes to press the button 55 to switch off the electrical apparatus 10. Current $i_3$ in the circuit of the diode 56 is interrupted, current $i_1$ increases and becomes greater than current $i_2$, and the transistors 41 are blocked. This results in the electromagnetic relay 16 (FIG. 2) of the units 4 and 5 for testing the communication line for condition being de-energized and the switching contacts 18 (FIG. 3) being switched over. As a result, voltage is not applied to the electromagnetic relay 38 of the actuating unit 14, and the electrical apparatus 10 being controlled is switched off.

When the impedance in the communication line 1 (FIG. 4) increases, current $i_3$ in the circuit of the diode 56 decreases, and currents $i_1$ in the circuits of the diodes 49 increases. At the moment when currents $i_1$ become to prevail over current $i_2$, the transistors 41 of the units 8, 9 will be blocked which will result in switching off of the electrical apparatus 10 being controlled.

When pulse interferences appear in the communication line 1, the interfering signal unblocks the transistors 41 of the units 8, 9 so as to go to the inputs of the interference suppression units 12 (FIG. 2) so that the transistors 26 of these units might be unblocked. This results in that the transistors 25 remain nonconductive and in that charging of the capacitors 30 begins. When the interference signal disappears, the transistors 41 (FIG. 4) of the units 8,9 and the transistors 26 (FIG. 2) of the units 11, 12 become nonconductive, and the capacitor 30 becomes a power supply for the transistors 25. Consequently, the transistors 25 are unblocked, and the charged capacitors 30 are discharged. Thus, the device for remote control is back in the initial state.

When the wires of the communication line 1 are short circuited, voltage at the inputs of the units 8, 9 (FIG. 4) abruptly decreases to reach a nearly zero value. As a result, currents $i_1$ and $1_2$ in the parallel paths of the units 8,9 tend to zero. In this case, if the transistors 41 are conductive, they become blocked and will remain in this state all the time when the short-circuit condition of the communication line 1 exists so that protection of the device for remote control might be ensured.

In addition to the above described functions, the device for remote control ensures protection against inadvertent actuation when a voltage of up to 1.5 of the nominal voltage value is applied to the power supply 3. This is due to the fact that the charge time constant of the capacitors 51 of the units 8,9 is greater than that of the capacitors 52, and the discharge time constant of the capacitors 51 is smaller than that of the capacitors 52.

Consequently, when there is no control signal coming from the communication line 1, the difference $i_1-i_2$ of currents $i_1$ and $i_2$ will always be a constant value, the current $i_1$ always prevailing over the current $i_2$. Therefore, the transistors 41 of the units 8, 9 always (when voltage across the power supply 3 changes its value) remain blocked.

When any element in the units 4,5 or 6,7 or 8,9 (FIG. 1) is faulty, non-synchronous switching of the contacts 18 (FIG. 3) in the units 4 and 5 occurs resulting in opening of the contact 37 of the logical circuit 13 since the winding 35 of the relay is de-energized. Opening of the contact 37 of the logical circuit 13 results in the relay 38 of the actuating unit 14 being de-energized, the actuating unit 14 causing in its turn switching-off of the electrical apparatus 10 being controlled or its blocking from further actuations.

The use of two current comparison units 8,9 (FIG. 1) and two interference suppression units 11, 12 in the device for remote control of an electrical apparatus according to the invention makes it possible to eliminate the influence of pulse interferences appearing in the communication line 1 during operation and false operation of the device during transient processes in the elements of the current comparison units 8, 9 when the power supply voltage is applied or when the wires of the communication line 1 are short-circuited. The use of the logical circuit 13 makes it possible to carry out self testing of the elements of the units and assemblies of the whole device for remote control for normal condition. All these factors enlarge functional capabilities of the remote control device according to the invention.

What is claimed is:

1. A device for remote control of an electrical apparatus, comprising:

a communication line leading to a control desk;

a power supply connected to said communication line for supplying a communication signal thereon a first signalling means for signalling that said communication line is in operation mode, said signalling means having an input coupled to said power supply;

a first current amplifier coupled between an output of said first signalling means and said communication line;

a first current comparison means coupled to said communication line and to a control input of said first current amplifier for comparing a current flow on said communication line in one direction with a current flow in an opposite direction for determining that said communication line is in said operation mode and for providing a first control signal to said first current amplifier, said first current amplifier operating said first signalling means into a first mode indicating that said communication line in said operation mode;

a first interference suppression means coupled between said first current comparison means and said first current amplifier for suppressing signals coupled to said first current comparison means from said communication line other than said communication signal;

a second signalling means for signalling that said communication line is in said operation mode, said second signalling means having an input coupled to said power supply;

a second current amplifier coupled between an output of said second signalling means and said communication line;

a second current comparison means coupled to said communication line and to a control input of said second current amplifier for comparing a current flow on said communication line in one direction with a current flow in an opposite direction for determining that said communicating line is in said operation mode and for providing a second control signal to said second current amplifier, said second current amplifier operating said second signalling means into a first mode indicating that said communication line is in said operation mode;

a second interference suppression means coupled between said current comparison means and said second current amplifier for suppressing signals coupled to said second current comparison means from said communication line other than said communication signal;

a logic circuit means coupled to an output of said first and said second signalling means and being coupled to said power supply for determining that said first and said second signalling means are in said first mode;

actuating means coupled to an output of said logic circuit means and an output of said first signalling means for actuating said electrical apparatus when said first and said second signalling means are in said first mode.

2. Apparatus according to claim 1, wherein each of said first and second interference suppression means comprises:

a limiting resistor in series with a diode, the anode of said diode being connected to said resistor;

a first capacitor having a first lead connected to said anode and a second lead coupled to a first output of said interference suppression means;

a second capacitor having a first lead connected to a cathode of said diode and a second lead coupled to said first output;

a Zener diode, a cathode of said Zener diode being connected to said cathode of said diode and said first lead of said second capacitor, an anode of said Zener diode being coupled to a second output of said interference suppression means;

first and second resistors having first leads connected to said anode and cathode of said diode, respectively;

a third resistor having a first lead connected to said cathode of said diode;

a first transistor having an emitter coupled to said first output, a base connected to a second lead of said third resistor and a collector coupled to a second lead of said second resistor;

a second transistor having an emitter coupled to said first output, a base connected to said collector of said first transistor and a collector connected to a second lead of said first resistor.

3. Apparatus according to claim 1 wherein said logic circuit means comprises:

a rectifier means having an output coupled to said power supply;

a filter means coupled to an output of said rectifier means;

a limiting resistor in a series with said output of said rectifier means;

a relay having an actuating coil, a first lead of said coil being connected to a second lead of said limiting resistor; a second lead of said coil being connected to a second output of said first signalling means; said relay having a contact actuated by said coil, said contact being connected to an input of said actuating means;

a capacitor connected in parallel with said coil;

a resistor connected between second outputs of said first and second signalling means.

4. Apparatus according to claim 1 wherein each of said first and second current comparison means comprises:

a first resistor having a first lead coupled to said power supply;

a first diode having a cathode connected to a second lead of said first resistor;

a second resistor having a first lead connected to an anode of said first diode;

a third resistor having a first lead connected to a second lead of said second resistor, said first lead and a second lead of said third resistor being coupled to control means in said electrical apparatus;

a second diode having an anode connected to said second lead of said third resistor and cathode coupled to said power supply;

a first capacitor having a first lead connected to said anode of said first diode and a second lead connected to said cathode of said second diode, said first capacitor having a charge time constant with said first resistor and a discharge time constant with said second and third resistor;

a fourth resistor having a first lead coupled to said power supply;

a third diode having an anode connected to a second lead of said fourth resistor;

a fifth resistor having a first lead connected to a cathode of said third diode and a second lead connected to said anode of said second diode;

a second capacitor having a first lead connected to said cathode of said third diode and a second lead coupled to said power supply, said second capacitor having a charge time constant with said fourth resistor which is less than the charge time constant of said first capacitor and a discharge time constant with said fifth resistor which is greater than the discharge time constant of said first capacitor;

a transistor having an emitter coupled to said power supply, a collector connected to an input of said first or second interference suppression means and a base connected to said anode of said second diode.

* * * * *